July 24, 1956  W. T. SPAEDER  2,755,555
LEVELING TARGET
Filed April 13, 1953

Inventor
WILLIAM T. SPAEDER
By Charles L. Lovercheck
Attorney

United States Patent Office 2,755,555
Patented July 24, 1956

2,755,555

LEVELING TARGET

William T. Spaeder, Erie, Pa.

Application April 13, 1953, Serial No. 348,530

1 Claim. (Cl. 33—74)

This invention relates to markers and more particularly to targets for use in leveling, surveying, and other similar measuring operations where a semi-permanent mark or monument of a point is desirable.

In leveling operations in any type mechanical and hydraulic installation building construction and in installation of plumbing, electrical, conveyor, pipe line construction, and similar equipment in buildings as well as in the leveling of terraces, drainage ditches, and similar operations, it is necessary to mark the location of reference points that indicate the positions of locations being leveled. It has been the practise previously in laying out plumbing and steam pipes in buildings to measure the location of a given point on a wall, concrete pier or column, or pipe and make a pencil mark at the particular point. These pencil marks were easily effaced and often lost by the person making the measurements so that it was impossible to determine at a later time where the points had been located. Also, it is difficult to relocate pencil and similar marks on a wall or similar support where the mark is located in shadows or in dark places in a building.

It is, accordingly, an object of my invention to overcome the above and other defects in previous methods of leveling and more particularly to provide a leveling target which can be readily supported or attached to any object such as a fence post, telephone pole, building, shovel handle, crowbar, piece of pipe, or stake or any stationary object encountered along the way where leveling or grading operations are being carried out or performed.

Another object of my invention is to provide a surveyor's target having a convenient type of a symbol on the face thereof to indicate the particular level and/or horizontal point required.

Another object of my invention is to provide a target that will mark the location of a point for a surveyor or engineer to indicate any relative measurement, either in a horizontal or vertical plane.

It is another object of my invention to provide a leveling or surveying target which may be left remaining attached to any suitable surface, wall, or other stationary object or support so that a semi-permanent record of the point is easily discernible for other craftsmen, mechanics, plumbers, or electricians who may later have to refer to the mark in the installation of any type of equipment.

Another object of my invention is to provide a target which may be attached to any surface on the inside or outside of a building of wood, cement, or metal or be attached to any surface, regardless of the construction and the material and indicate all pertinent measurements, whether in elevation or in horizontal planes.

Another object of my invention is to provide a leveling or surveying target which, in addition to providing the memorandum of a specific point, provides a convenient surface for writing memorandum of measurements taken at the aforesaid particular station.

Another object of the invention is to provide a surveyor's target having an adhesive emulsion on one side thereof covered with a paper covering, the paper being removable just prior to the time the target is to be attached to the supporting surface.

A further object of my invention is to provide a surveyor's or leveler's target which will be convenient for the person using the target to carry with him.

Another object of my invention is to provide a surveyor's or leveler's target which can be readily removed from any surface after use and which will not damage or mar the surface in any manner.

Another object of the invention is to provide a surveyor's or leveler's target having contrasting colors on the face thereof which will render it easy to discern the target in dim light.

Another object of this invention is to provide a leveler's or a surveyor's target having a reflecting surface thereon which can be readily relocated in a minimum of light or in a comparatively dark place.

With the above and other objects in view, the present invention consists of the combination and arrangement of parts hereinafter more fully described, illustrated in the accompanying drawing, and more particularly pointed out in the appended claim, it being understood that changes may be made in the form, size, proportions, and minor details of construction without departing from the spirit or sacrificing any of the advantages of the invention.

Figures 1, 2:
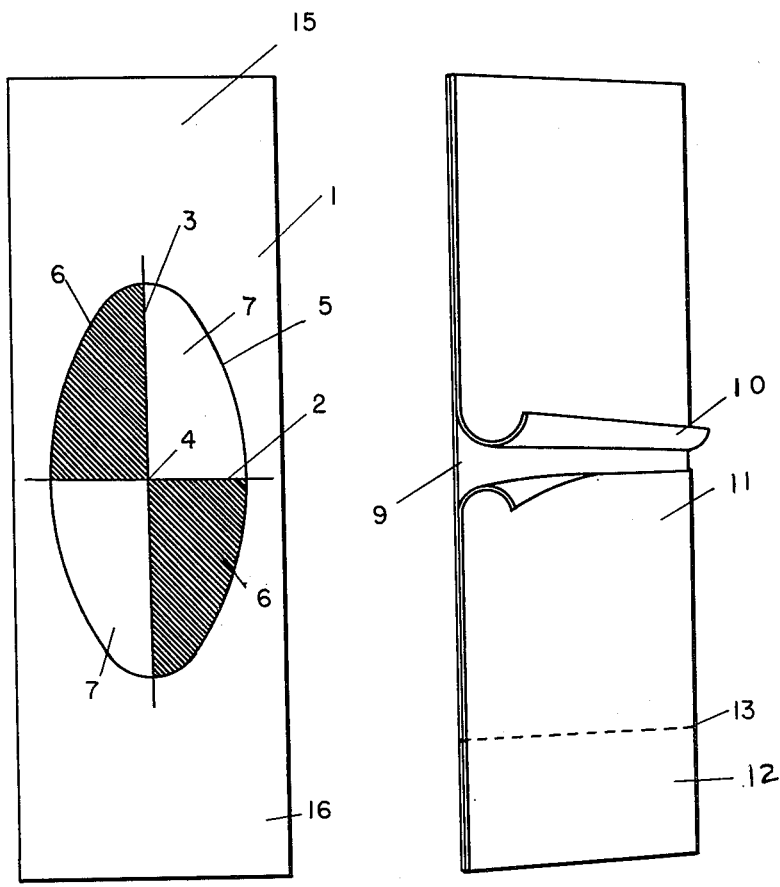
Fig. 1 is a front view of my invention.
Fig. 2 is a rear perspective view of my invention showing the paper backing partially removed.

Now with more specific reference to the drawing, I disclose a surveyor's target 1 having a surface suitable for recording memorandum of pertinent data at 15 and 16 provided thereon with a horizontal line 2 and a vertical line 3 intersecting at 4. The diagonal portions of the space between the area defined by the line 5 is colored in a dark contrasting color 6 and a light contrasting color 7. The diagonally disposed areas will be coated with fluorescent material where the targets are to be used in dimly lighted buildings or mines. Considerable card material is provided above and below the area defined by the line 5 whereon a number of measurements and operations can be recorded. The back surface 9 is covered with a pressure sensitive adhesive and waterproof paper coverings 10 and 11 are attached to the sensitive adhesive surface 9 to prevent the adhesive surface from drying out or becoming damaged or collecting dirt. The same pertinent information appearing on top 15 of the target may be recorded at the lower side 16. The target is perforated at 13 so that a card 12 can be easily removed from the main target portion to be used as a record to be returned to the surveyor, leveler, or mechanic.

In use, when a surveyor, mechanic, or leveler has established a given level beside a wall or other support member, he will grasp one end, such as 10, of the backing member and pull it off of the adhesive material. Then he will carefully locate the horizontal line 2 and/or the vertical line 3 at the exact vertical and/or horizontal position desired to record the point and pull the backing member 10 from the back of the adhesive surface 9 and press the adhesive surface of the target against the supporting member. The adhesive will hold the target in place, thereby providing a semi-permanent record of the point established. The leveler may leave the lower half 11 of the backing member in place on the target so that it can be easily grasped to remove it or if he wants a more permanent type of target, he can remove the lower backing paper 11 and press the entire adhesive surface 9 against the supporting surface. If he desires, he can tear off the card 12 below the perforated surface 13 and make whatever notes thereon he desires and record the corresponding notes on the front surface 16 of the member 11. If desired, he can remove the backing paper from the lower card 12 and paste the lower member in his notebook for a permanent record.

In the foregoing specification, I have set forth the invention in its preferred practical forms but I am aware that the structure shown is capable of modification within a range of equivalents without departing from the invention which is to be understood is broadly novel as is commensurate with the appended claim.

What I claim is:

A surveyor's target comprising a sheet of material, an area on one side of said material being enclosed by a line, two lines intersecting at right angles adjacent the center of said area, a pressure sensitive adhesive material on the opposite side of said sheet, and two removable sheets of covering material disposed on said adhesive material, one end of said sheet being perforated whereby the end can be removed to carry data as a permanent record.

References Cited in the file of this patent

UNITED STATES PATENTS

| | | |
|---|---|---|
| 1,101,375 | Wuth | June 23, 1914 |
| 1,610,477 | Sanford | Dec. 14, 1926 |
| 2,095,437 | Fox | Oct. 12, 1937 |
| 2,292,272 | Hirshfield | Aug. 4, 1942 |
| 2,382,736 | Mason | Aug. 14, 1945 |

OTHER REFERENCES

"The ABC of Luminescence." Copyright 1944 by the New Jersey Zinc Co., 160 Front Street, New York, N. Y. (Copy in Div. 54.)